(12) United States Patent
Oki

(10) Patent No.: US 7,542,169 B2
(45) Date of Patent: Jun. 2, 2009

(54) HALFTONE IMAGE PROCESSING USING A DITHER MATRIX WITH A CONSECUTIVE ORDER AND SHIFTED FROM AN ADJOINING BLOCK IN A MAIN SCAN DIRECTION

(75) Inventor: Makoto Oki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 600 days.

(21) Appl. No.: 11/272,662

(22) Filed: Nov. 14, 2005

(65) Prior Publication Data

US 2007/0035773 A1 Feb. 15, 2007

(30) Foreign Application Priority Data

Aug. 12, 2005 (JP) ............................. 2005-234166

(51) Int. Cl.
*H04N 1/405* (2006.01)
*H04N 1/52* (2006.01)

(52) U.S. Cl. .................. 358/2.1; 358/3.06; 358/3.13; 358/3.23; 358/534

(58) Field of Classification Search ................ 358/1.9, 358/2.1, 3.06, 3.09, 3.13–3.18, 534–535, 358/462, 3.23
See application file for complete search history.

(56) References Cited

FOREIGN PATENT DOCUMENTS

| JP | 01-249350 A | | 10/1989 |
| JP | 09-134047 A | | 5/1997 |
| JP | 11-286132 A | | 10/1999 |
| JP | 2000094756 A | * | 4/2000 |
| JP | 2003-051942 A | | 2/2003 |
| JP | 2004-080109 A | | 3/2004 |

* cited by examiner

*Primary Examiner*—Scott A Rogers
(74) *Attorney, Agent, or Firm*—Frishauf, Holtz, Goodman & Chick, P.C.

(57) ABSTRACT

An image processing apparatus comprising a halftone processing section which executes a halftone process for input image data, wherein the halftone processing section executes the halftone process, by using a dither matrix, the order of producing the dots in the halftone process is consecutive in a main scanning direction, in the pixel block, and the starting position of producing the dots in the pixel block is shifted in the main scanning direction by no less than two dots from the starting position of the adjoining pixel block in the sub scanning direction.

21 Claims, 11 Drawing Sheets

THRESHOLD LUT FOR ELEMENT 1

THRESHOLD LUT FOR ELEMENT 4

THRESHOLD LUT FOR ELEMENT 2

THRESHOLD LUT FOR ELEMENT 5

THRESHOLD LUT FOR ELEMENT 3

THRESHOLD LUT FOR ELEMENT 6

FIG. 9

| 5 | 6 | 7 |
|---|---|---|
| 4 | 1 | 8 |
| 3 | 2 | 9 |

HALFTONE IMAGE PROCESSING USING A DITHER MATRIX WITH A CONSECUTIVE ORDER AND SHIFTED FROM AN ADJOINING BLOCK IN A MAIN SCAN DIRECTION

This application is based on Japanese Patent Application No. 2005-234166 filed on Aug. 12, 2005, in Japanese Patent Office, the entire content of which is hereby incorporated by reference.

BACKGROUND OF THE INVENTION

1. Field of the Invention

The present invention relates to an image processing apparatus that converts input image data into halftone image data, an image forming apparatus having the image processing apparatus, a program, and a method of image processing.

2. Description of the Related Art

In the case of halftone representation in image forming apparatus of electrophotographic system, a halftone processing is carried out using a threshold matrix in which threshold values are arranged substantially radially so as to be larger from the center of the threshold matrix to obtain a dot-like shape output that is similar to an image printed by a conventional printer (for example, see Patent Document 1).

An example of the threshold matrix used for representing 256 gradations with 9 pixels is shown in FIG. 9. The threshold matrix in FIG. 9 is provided with elements 1 to 9 that are respectively correlated to, for example, threshold LUTs (Look Up Tables) shown in FIG. 10, and when the halftone processing such as a dither processing is applied to image data using this threshold matrix, dots are generated in the order of the element number from a position of a pixel corresponding to an element 1, so that the dot-like shape (eg. circular shape) can be maintained regardless of gradation differences.

[Patent Document 1] Japanese Patent Publication Laid-Open No. 2004-80109

When forming an image in the image forming apparatus of the electrophotographic system, the output characteristic for one pixel has an S-like shape as shown in FIG. 11 reflecting the rise-time in the laser emission. Under such an output characteristic, dots are generated in the order of the element number shown in FIG. 9, wherein the rise-time of an output signal is delayed each time the dot is generated at a position in which the pixels disposed in the sequential order of the dot generation are not adjacent side by side, and a gradation jump occurs, thereby the gradation property of the input image is deteriorated. In order to prevent this, adjustment has been carried out, such as, that applies a γ curve to every gradation characteristic in the dot generation to modify the output characteristic of FIG. 11 as linear as possible. However, because the gradation characteristic in the rise-time is influenced by the dot generation order, this method has needed substantial amount of adjustment work in order to obtain the gradation without jump.

SUMMARY OF THE INVENTION

It is an object of the present invention to allow halftone representation without deteriorating the gradation property of the input image.

In accordance with a first aspect of the present invention, an image processing apparatus, comprising a halftone processing section which executes a halftone process for input image data inputted into the image processing apparatus, wherein the halftone processing section executes the halftone process, by using a dither matrix, to convert a gradation value of each pixel of the input image data into halftone image data in which the each pixel is represented by a dot in a pixel block which has a plurality of dots, the order of producing the dots in the halftone process is consecutive in a main scanning direction, in the pixel block, and the starting position of producing the dots in the pixel block is shifted in the main scanning direction by no less than two dots from the starting position of the adjoining pixel block in the sub scanning direction.

In accordance with a second aspect of the invention, an image forming apparatus which comprises the image processing section.

In accordance with a third aspect of the invention, a program for making a computer execute a process for image processing, the process comprising the step of halftone process which executes a halftone process for input image data inputted, wherein the halftone process is executed in the halftone process, by using a dither matrix, to convert a gradation value of each pixel of the input image data into a halftone image data in which the each pixel is represented by a dot in a pixel block which has a plurality of dots, the order of producing the dots in the halftone process is consecutive in a main scanning direction, in the pixel block, and the starting position of producing the dots in the pixel block is shifted in the main scanning direction by no less than two dots from the starting position of the adjoining pixel block in the sub scanning direction.

In accordance with a forth aspect of the present invention, an image processing method, comprising the step of executing halftone process for the input image data by using a dither matrix, to convert a gradation value of a pixel of the input image data into halftone image data in which the each pixel is represented by a dot in a pixel block which has a plurality of dots, wherein the order of producing the dots in the halftone process is consecutive in a main scanning direction, in the pixel block, and the starting position of producing the dots in the pixel block is shifted in the main scanning direction by no less than two dots from the starting position of the adjoining pixel block in the sub scanning direction.

BRIEF DESCRIPTION OF THE DRAWINGS

[FIG. 7] Views showing image examples, wherein FIG. 7a is a view showing an example of an image determined as gradation priority, and FIG. 7b is a view showing an example of an image determined as resolution priority;

[FIG. 9] A view showing an example of a threshold matrix used for representing 256 gradations with 9 pixels;

DETAILED DESCRIPTION OF THE PREFERRED EMBODIMENT

Hereinafter, the preferred embodiment of the present invention will be described in detail with reference to the drawings.

Incidentally, in the present embodiment, the case in which the pixel numbers of an input image and an output image are equal to each other for convenience of explanation, hut the present invention is not limited thereto.

Figure 1:
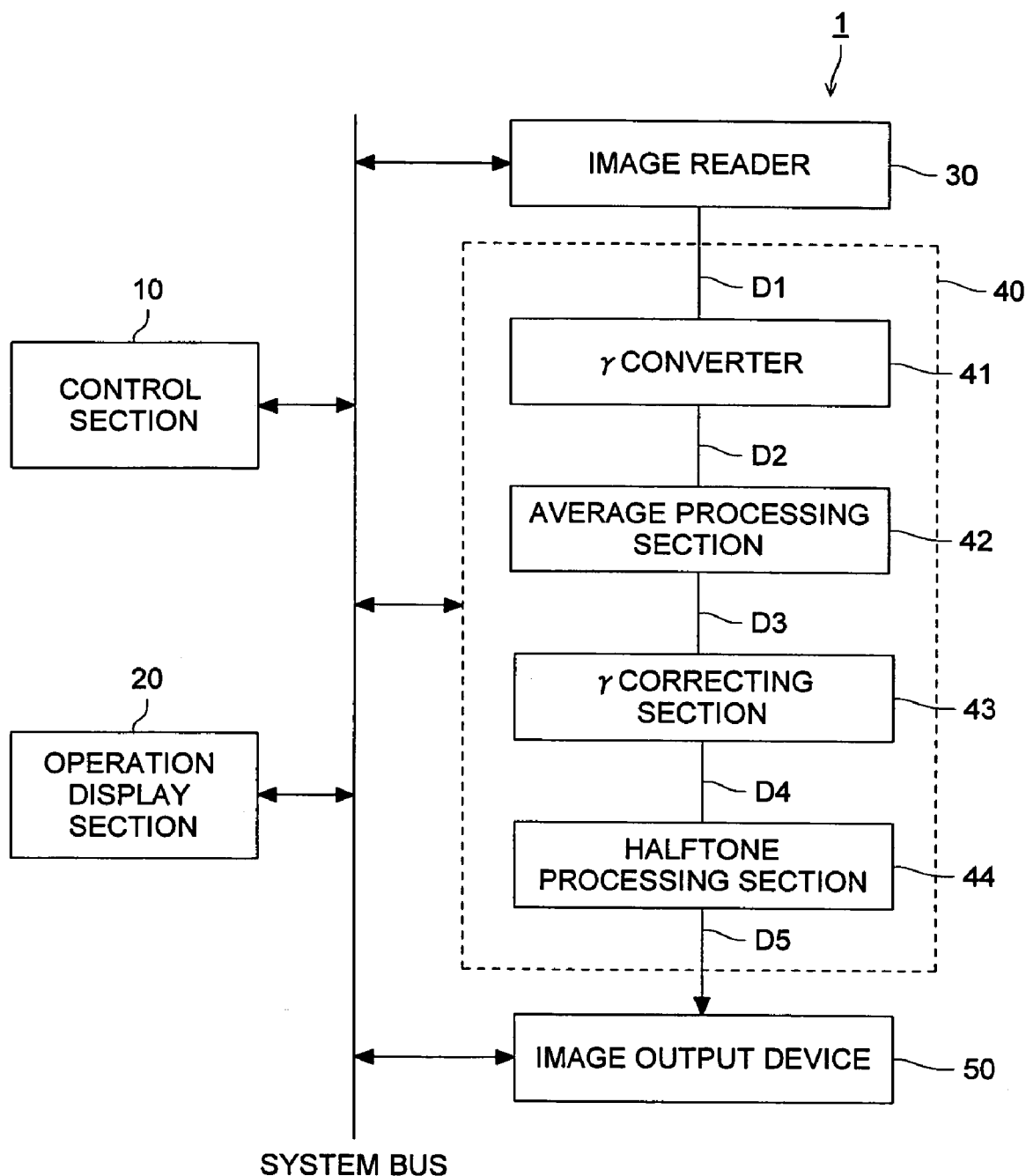
[FIG. 1] A block diagram showing the functional configuration of an image forming apparatus 1.

FIG. 1 shows an example of the functional configuration of an image forming apparatus 1 according to the present invention. The image forming apparatus 1 is a monochrome copier, which is composed of a control section 10, an operation display section 20, an image reader 30, an image processing apparatus 40, an image output device 50 and other related components as shown in FIG. 1.

The control section 10 is composed of a CPU, a ROM (Read Only Memory), a RAM (Random Access Memory) and the like. The CPU of the control section 10 reads system programs and various processing programs stored in the ROM and expands the programs in the RAM to control the operations of each of the sections in the image forming apparatus 1 depending on the expanded programs, by an operation of the operation display section 20.

The operation display section 20 is composed of an LCD (Liquid Crystal Display) and the like, which makes a display of the states of various operation buttons and devices, a display of operation states of the functions and the like on a display screen, in response to an instruction of a display signal which is input from the control section 10. Mounted on the display screen of the LCD is a touch panel of pressure-sensitive type (resistance film pressure type) in which transparent electrodes are arranged in a mesh-like fashion, wherein the touch panel detects as a voltage value an X-Y coordinate of a power point pressed down by a finger, a touch pen or other tools, and outputs the detected position signal as an operation signal to the control section 10. Incidentally, the touch panel is not limited to pressure-sensitive type, but may be of any other type such as electrostatic type or optical type. Further, the operation display section 20 is equipped with various operation buttons including number buttons and a start button, which outputs the operation signal to the control section 10 by a button operation.

The image reader 30 is equipped with a light source, a CCD (Charge Coupled Device), an A/D converter and other related components, which images a reflection of a light that is light-scanned from the light source to a document and carries out photoelectric conversion to read an image of the document, A/D converting the read image, and outputting image data D1 to the image processing apparatus 40.

The image processing apparatus 40 applies various image processing to the image data D1, and outputs it as image data D5 to the image output device 50. In other words, the image data D1 which has been input to the image processing apparatus 40 is subjected to γ conversion in a γ conversion section 41, wherein the converted image data D2 is subjected to an average processing in an average processing section 42 and is further subjected to γ correction in a γ correcting section 43, the corrected image data D4 is subjected to a dither processing in the halftone processing section 44, and then the processed image data D5 is output to the image output device 50.

Incidentally, in the present embodiment, the description will be made by taking an example of a laser beam printer as the image output device 50, but any device that outputs an image based on the image data may be used as the image output device, including an image forming apparatus other than the laser beam, a display and the like.

The functions of each of the sections of the image processing apparatus 40 are assumed to be realized by software processing through the cooperation of the CPU provided in the image processing apparatus 40 and the programs memorized in the ROM provided in the image processing apparatus 40, but the functions may be realized by a dedicated hardware. It is also possible to configure such that the programs for realizing the functions are memorized in the ROM of the control section 10 to realize the functions by the software processing through the cooperation of the CPU and programs of the control section 10.

The γ conversion section 41 converts the image data D1 that is read in the image reader 30 from the luminance-linear gradation values into the density-linear gradation values, and outputs the converted image data D2 to the average processing section 42. Incidentally, in the present embodiment, it is assumed that the image data D2 is represented by 256 gradations, but not limited to this.

The average processing section 42 applies the average processing that is synchronized with the halftone processing section 44 in the later stage to the image data D2. More particularly, the average processing section 42, when the dither processing that represents 256 pixels with 3×6 pixels is carried out in the halftone processing section 44, partitions the image data D2 into blocks each having 3×6 pixels, calculating an average value of image signals of pixels in each block, and determining the average value as the image signal value of the pixels in the block.

The block average processing is applied to the image data D2 in the average processing section 42, and then the averaged image data D3 is output to the γ correcting section 43.

The γ correcting section 43 converts the level of the image data D3 using a predetermined γ correction curve to correct the gradation characteristic of the image output device 50. The image data D4 in which the gradation characteristic has been corrected by the γ correcting section 43 is output to the halftone processing section 44.

The halftone processing section 44 carries out the halftone processing (dither processing) using a dither matrix with an organizational dither method to convert the gradation values of each of the pixels of the image data D4 into halftone image data represented by dots within pixel blocks each composed of a plurality of pixels (herein, 3×6 pixels).

Figure 2:
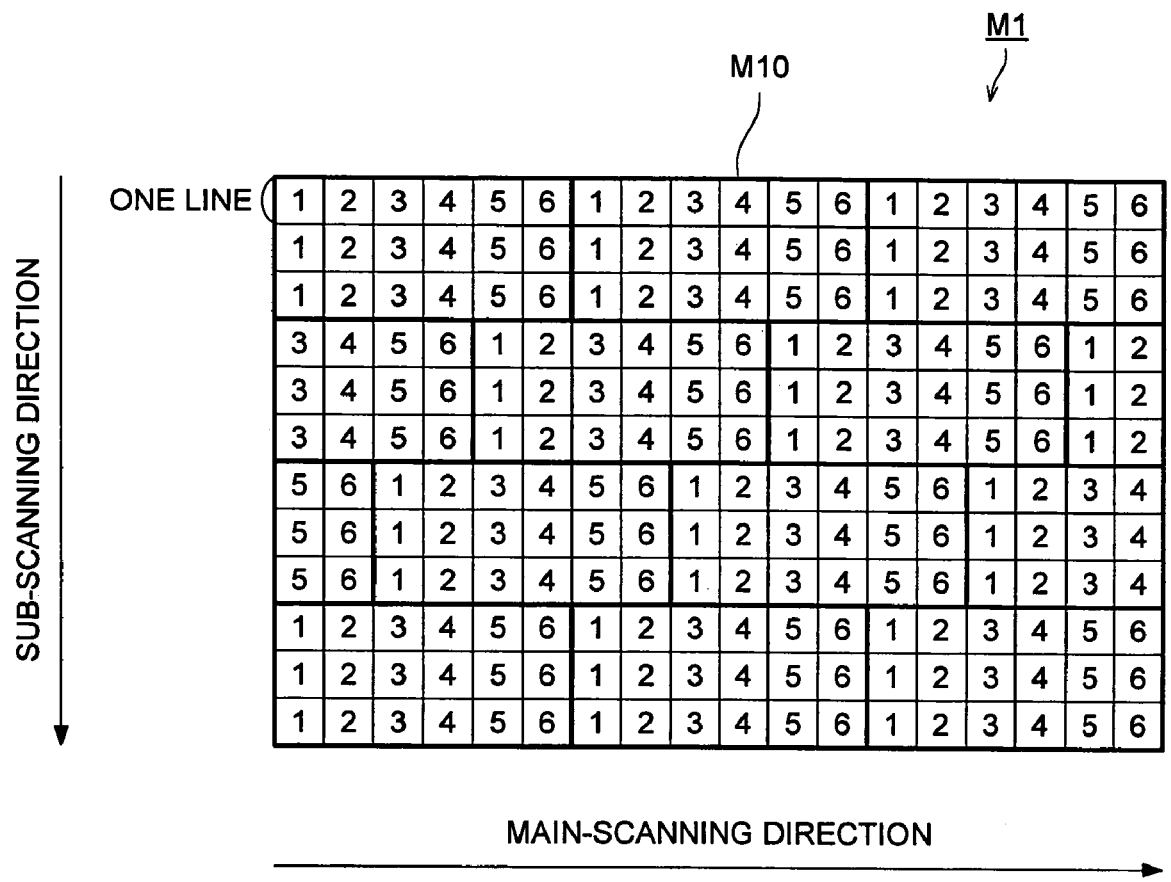
[FIG. 2] A view showing a dither matrix M1 used in a halftone processing section 44 of FIG. 1.

In the present embodiment, the halftone processing section 44 is equipped with a memory section not shown and memorizes the dither matrix M1 shown in FIG. 2. One line of the dither matrix M1 corresponds to one scan of a laser in the image output device 50 which will be described below.

Figure 3:
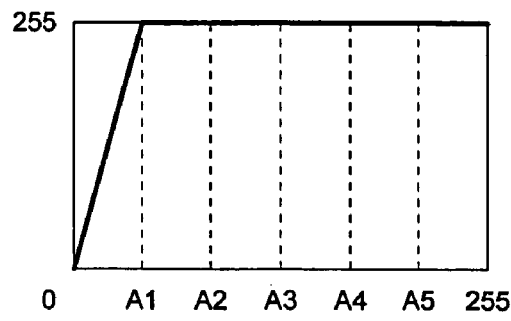
[FIG. 3] A view showing threshold LUTs correlated to each of the elements of the dither matrix M1 of FIG. 2.
Figure 3:
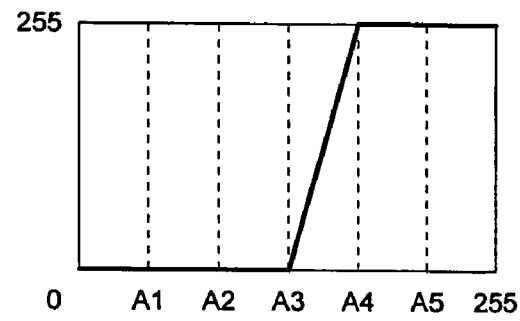
Figure 3:
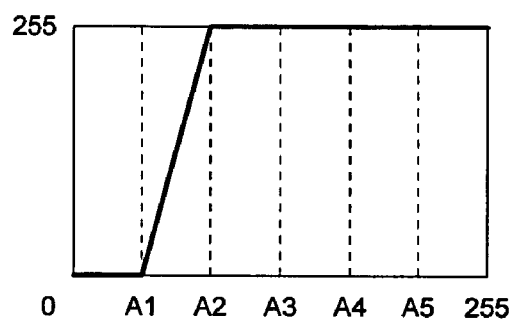
Figure 3:
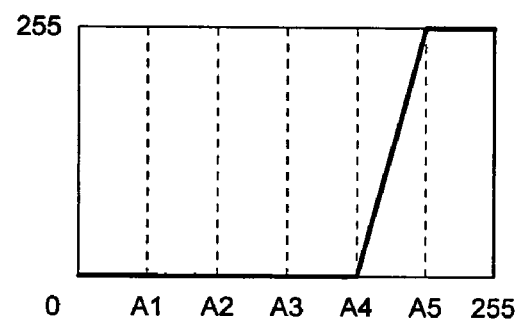
Figure 3:
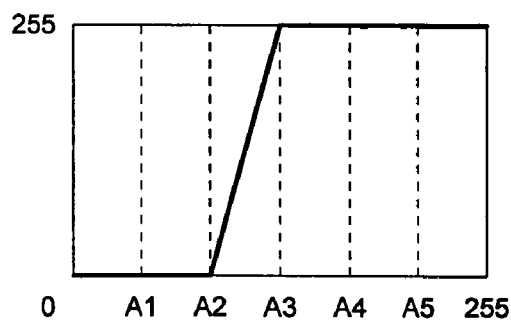
Figure 3:
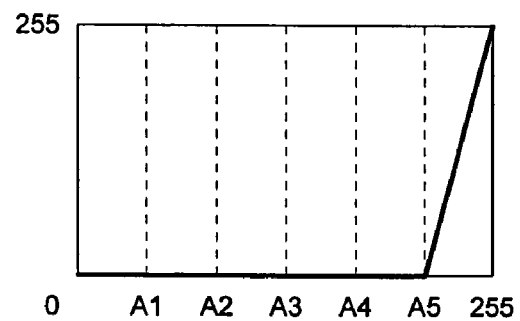

This dither matrix M1 is configured such that 3×6 dither matrices M10 (indicated by thick lines) are periodically arranged as shown in FIG. 2. Each dither matrix M10 is provided with elements 1 to 6 arranged in a matrix-like form. The elements 1 to 6 are correlated with the threshold LUTs shown in FIG. 3 respectively, wherein the halftone processing section 44 inputs the gradation values of each of the pixels of the image data D4 and obtains output values from the threshold LUTs to convert the image data D4 into the image data D5 which is the halftone image data. Thus, the image data D5 is composed of dot-like periodical patterns each having 3×6 pixels.

In the image output device 50 described below, a pixel position having a gradation value other than zero in the data D5 is irradiated by a laser to dot on a paper, namely, a dot is generated thereon, so that in the pixel positions corresponding to the element 1 of each of the dither matrices M10 shown in FIG. 2, dots are generated when the input gradation value exceeds zero. Similarly, in the pixel positions corresponding to the element 2, dots are generated when the input gradation value exceeds A1, in the pixel position corresponding to the element 3, dots are generated when the input gradation value exceeds A2, in the pixel positions corresponding to the element 4, dots are generated when the input gradation value exceeds A3, in the pixel positions corresponding to the element 5, dots are generated when the input gradation value exceeds A4, and in the pixel positions corresponding to the element 6, dots are generated when the input gradation value exceeds A5. In other words, within the pixel blocks corresponding to each of the dither matrices M10 of the image data D5, dots are generated in the ascending sequence of the element number.

Herein, each dither matrix 10 of the dither matrix M1 is provided with the element 1 to element 6 which is arranged side by side in the ascending sequence toward the main-scanning direction of the laser, and by carrying out the dither processing using the dither matrix M1, the dot generation order of each line can be sequential in the main-scanning direction of the laser. Thus, when a dot is generated at the pixel position corresponding to the element 1, the output characteristic may has a delayed rise due to the laser switching from OFF to ON, but the dot at the pixel position of the element 2 or later is generated after the left neighboring dot is generated, so that the gradation jump due to the delayed rise which is the output characteristic caused by the laser switching from OFF to ON can be suppressed, thereby it is possible to represent halftone without deteriorating the gradation property.

Figure 4:
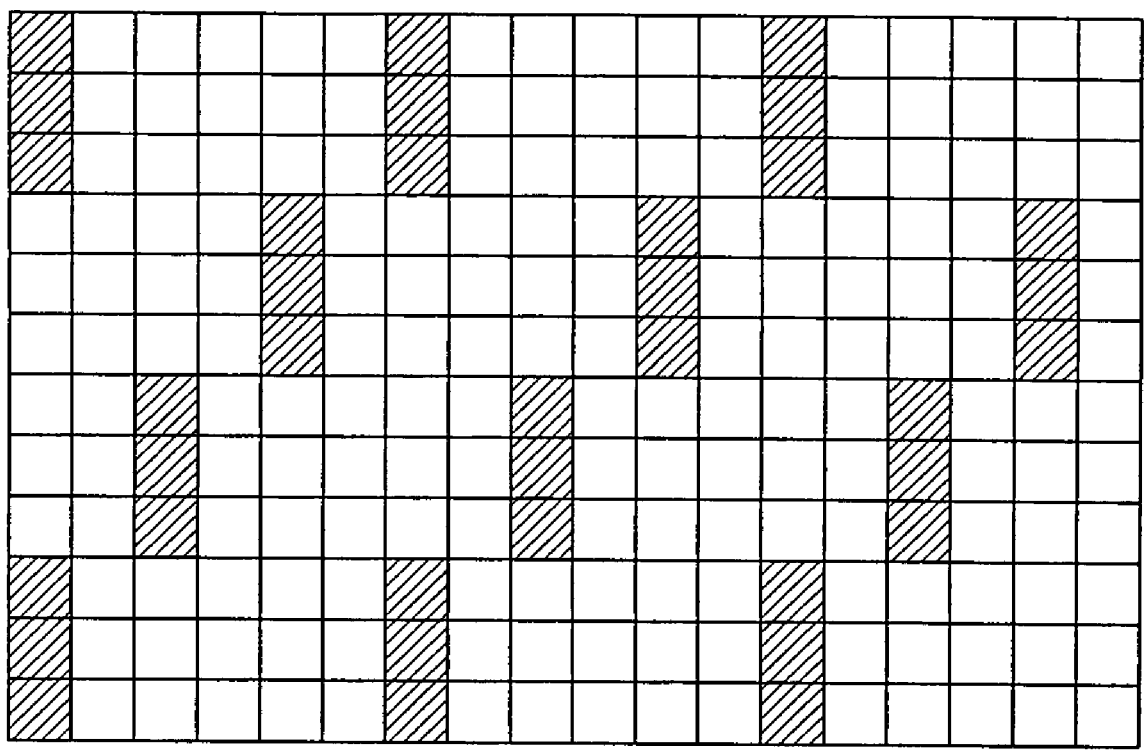
[FIG. 4] A view showing an output example of the case in which a uniform image with a gradation value A1 is output by an image output device 50 using the dither matrix M1 of FIG. 2.

Further, in the dither matrix M1, each dither matrix M10 is configured such that the start position thereof is displaced by the amount of two or more pixels in the main-scanning direction relative to the other dither matrix M10 which is adjacent in the sub-scanning direction. In the case in which the amount of displacement is around zero or one pixel in the main-scanning direction, dots generated between the pixel blocks adjacent in the vertical direction are likely to contact with each other, so that the periodic patterns of the image are likely to be recognized as linear through the human eyes. Thus, as shown in FIG. 2, by displaying the start positions of the dither matrices M10 that are adjacent to each other in the sub-scanning direction by the amount of two or more pixels in the main-scanning direction, the dot shape can be maintained to some extent as shown in FIG. 4. FIG. 4 is a view showing an output example of the case in which a uniform image of the gradation value A1 is output by the image output device 50 using the dither matrix shown in FIG. 2.

Incidentally, it is assumed that in the dither matrices M10 shown in FIG. 2, the positions of the element 1 are identical and the number of elements in the sub-scanning direction is three, but the present invention is not limited to this.

Now return to FIG. 1, the image output device 50 is composed of a pulse width modulator, a laser source, a photosensitive drum, an electrostatic charger, a development unit, a paper feeding section, a paper delivery section, a fixing device and the other related components, wherein the image output device 50 converts image data input from the image processing apparatus 40 into pulse width modulation by the pulse width modulator to emit a laser beam, exposing and scanning the laser beam on a surface of the photosensitive drum that is charged by the electrostatic charger to form an electrostatic latent image. Further, the image output device 50 conveys a printing paper of a size and orientation that are input and designated through the operation display section 20 from the paper feeding section, causing toner to adhere to a region of the photosensitive drum surface including the electrostatic latent image, transferring and fixing the toner onto the conveyed printing paper, and then delivering the transferred printing paper from the paper delivering section.

As described above, with the image forming apparatus 1 that generates dots in a sequential order in the main-scanning direction, the gradation jump due to the rise characteristic in the laser emission can be suppressed, so that it is possible to represent halftone without deteriorating the gradation property of the input image. Further, the dot generation start positions of the pixel blocks adjacent to each other in the sub-scanning direction of the laser are displaced by the amount of two or more dots in the main-scanning direction, so that it is possible to maintain the dot shape pattern as well as to prevent the recognition of the periodical patterns as linear by the human eyes.

(Variant)

Hereinafter, a variant of the embodiment will be described.

In the variant, the ROM of the control section 10 memorizes a parameter automatic setting processing program, wherein the control section 10 carries out a parameter automatic setting processing described below.

Further, the halftone processing section 44 memorizes a dither matrix M2 in addition to the above described dither matrix M1.

Figure 5:
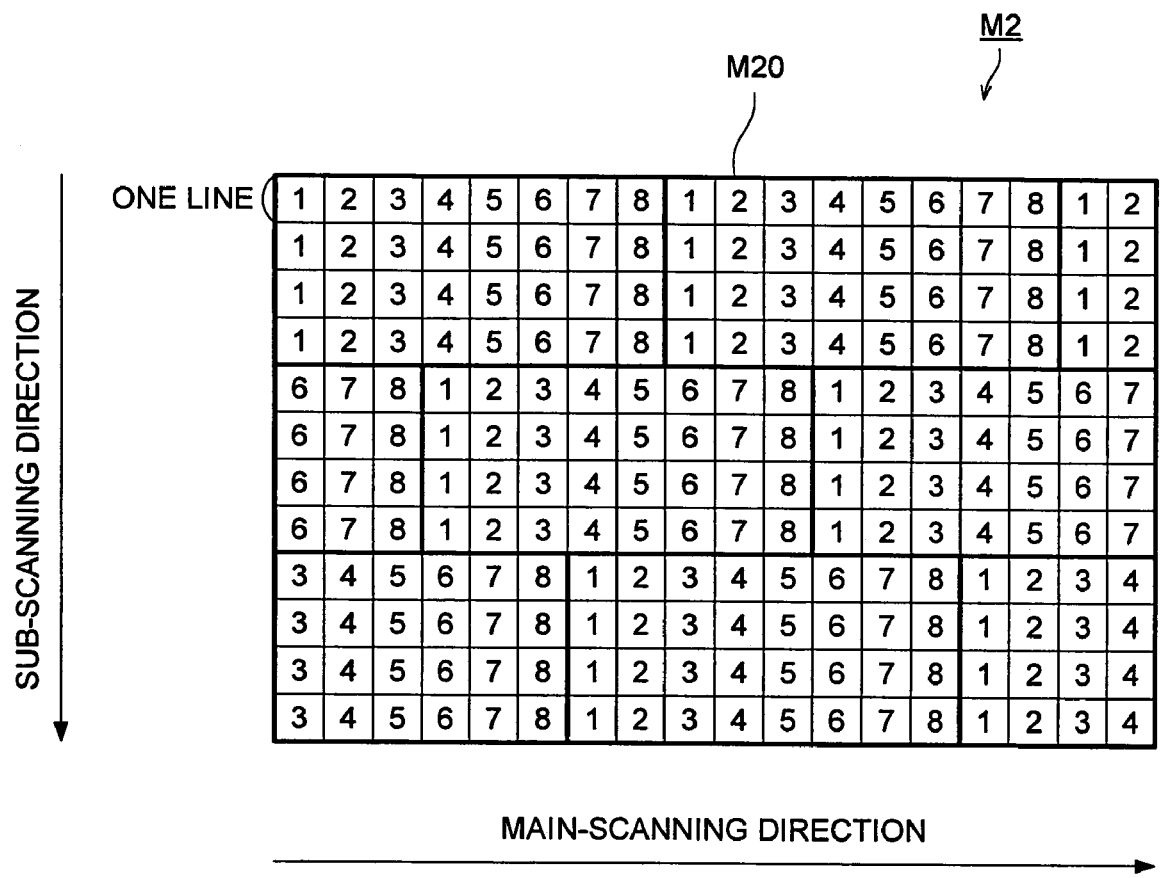
[FIG. 5] A view showing a dither matrix M2 used in the halftone processing section 44 of FIG. 1.

The dither matrix M2 is configured such that dither matrices M20 of a 4×8 pixel unit are arranged periodically as shown in FIG. 5. Each dither matrix M20 is provided with elements 1 to 8 arranged in a matrix-like form. The element 1 is correlated with a threshold LUT from which a dot is generated when the input gradation value exceeds zero. Similarly, the element 2 is correlated with a threshold LUT from which a dot is generated when the input gradation value exceeds B1, the element 3 is correlated with a threshold LUT from which a dot is generated when the input gradation value exceeds B2, the element 4 is correlated with a threshold LUT from which a dot is generated when the input gradation value exceeds B3, the element 5 is correlated with a threshold LUT from which a dot is generated when the input gradation value exceeds B4, the element 6 is correlated with a threshold LUT from which a dot is generated when the input gradation value exceeds B5, the element 7 is correlated with a threshold LUT from which a dot is generated when the input gradation value exceeds B6, and the element 8 is correlated with a threshold LUT from which a dot is generated when the input gradation value exceeds B7 respectively ($0<B1<B2<B3<B4<B5<B6<B7<255$).

Figure 6:
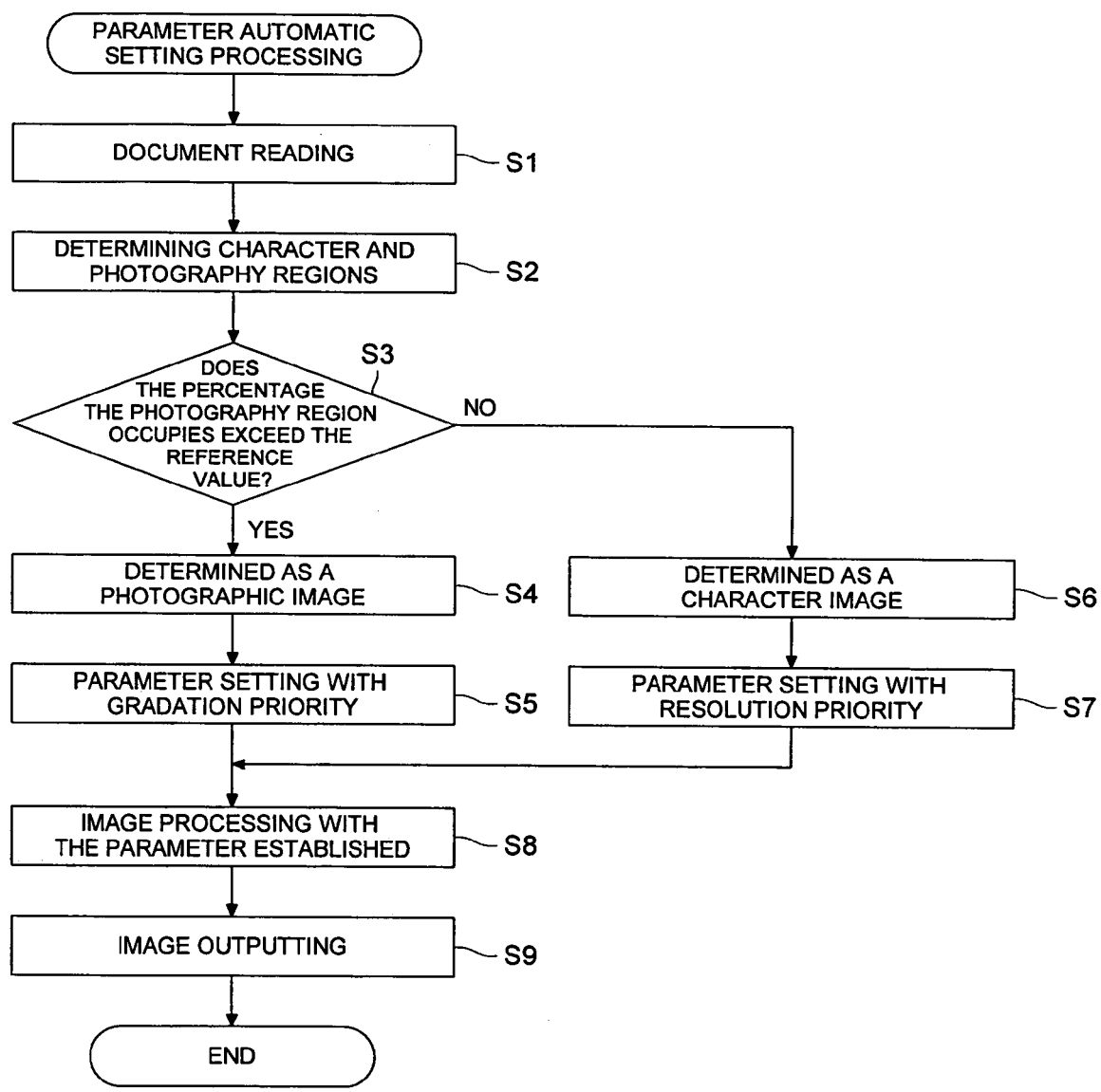
[FIG. 6] A flowchart showing parameter automatic setting processing which is carried out by a control section 10 of FIG. 1.

Hereinafter, the parameter automatic setting processing carried out by the control section 10 will be described with reference to FIG. 6. This processing is carried out when a parameter automatic setting mode is established through the operation display section 20 and the copy operation is designated, and the determining section is realized by the execution of this processing.

At first, an image of a document is read by the image reader 30 (Step S1), and then a region determination processing is carried out relative to the obtained image data (Step S2).

In the region determination processing, the character region and the photography region within the image data are determined based on the total density and density gradation and density distribution and other parameters of the image data.

Next, the percentage of the photography region that accounts for the whole image data is calculated (Step S3), and when the photography region exceeds a predetermined reference value (Step S3; YES), the image data is determined as a photographic image (Step S4), and the parameter setting for gradation priority is notified to each of the sections of the image processing apparatus 40 (Step S5), and then the image processing is applied using a parameter with gradation priority in the sections of the image processing apparatus 40 (Step S8). For example, in the average processing section 42, the average processing is applied in a pixel block unit of 4×8 pixels, and the halftone processing is applied using the dither matrix M2 in the halftone processing section 44.

On the other hand, when the photography region does not exceed the predetermined reference value (Step S3; NO), the image data is determined as a character image (Step S6), and the parameter setting with resolution priority is notified to the sections of the processing apparatus 40 (Step S7), and then the image processing is applied using the parameter with resolution priority in the sections of the image processing apparatus 40 (Step S8). For example, in the average processing section 42, the average processing is applied in the pixel block unit of 3×6 pixels, and the halftone processing is applied using the dither matrix M1 in the halftone processing section 44.

The image data D5 having been processed by the image processing is output to the image output device 50, in which an image is formed and output on a transfer paper based on the image data D5 (Step S9), and the process ends.

Figure 7:
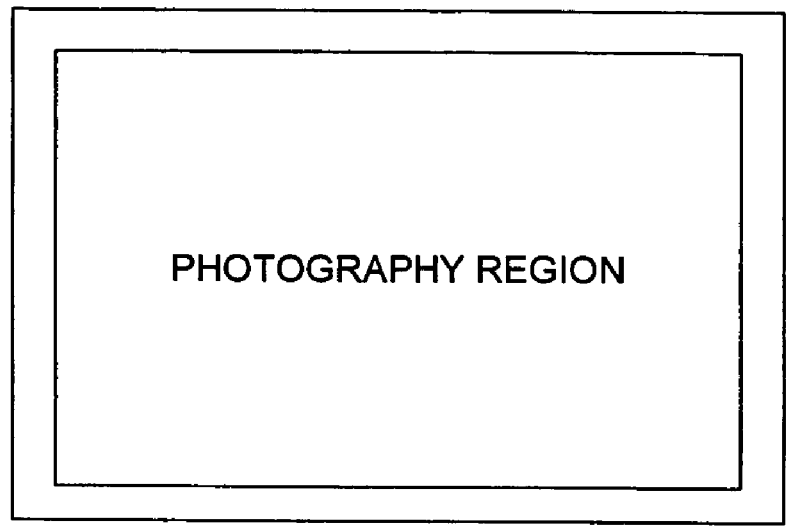
Figure 7:
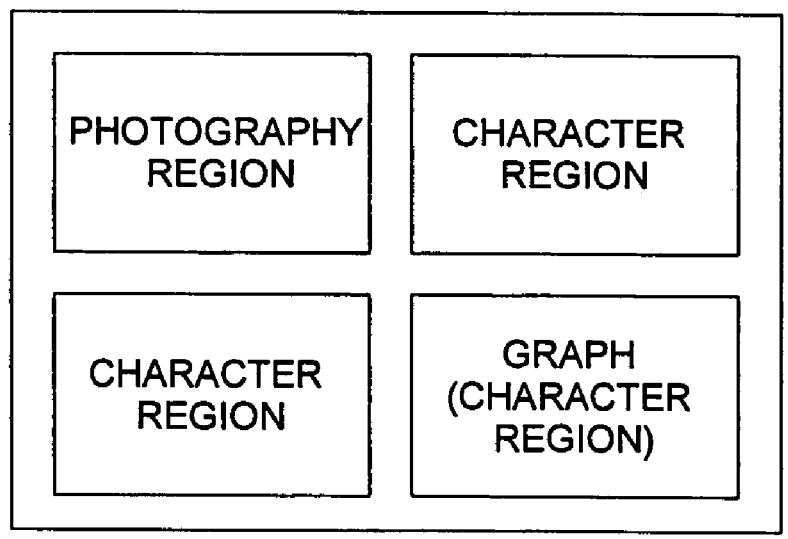

FIG. 7a shows an example of an image determined as gradation priority, and FIG. 7b shows an example of an image determined as resolution priority. As the image example shown in FIG. 7a, in the case of a photographic image in which the photography region occupies a wide range of the image, the halftone processing is carried out using the dither matrix M2, thereby the image with better gradation property can be obtained. In the case of the character image in which the character region occupies a wide range of the image, the halftone processing is carried out using the dither matrix M1, and thereby the image suitable for the fine character image can be obtained.

With the above described variant, it is possible to carry out the image processing by automatically setting the parameters suitable for the image characteristics of input image data. In particular, when the percentage of the photography region occupying the input image data exceeds the reference value, the halftone processing is applied using a dither matrix with a larger array number, so that the gradation reproduction capability can be improved, thereby an image with better gradation property can be output. In the image the character region mainly occupies, a fine image can be output. Incidentally, it may be configured such that, when the parameter setting mode is designated, a parameter screen for setting "gradation priority" or "resolution priority" is displayed on the display screen of the operation display section 20 in which the user can directly set "gradation priority" or "resolution priority", namely, the parameters including the dither matrix to be used.

Further, in the variant, the halftone processing section 44 is assumed to be provided with two dither matrices having different array numbers from each other, and when the input image data is determined as a photographic image, the dither matrix with the larger array number of the two dither matrices is set as the dither matrix to be used for the halftone processing, however, the halftone processing section 44 may be provided with two or more dither matrices, and when the input image data is determined as a photographic image, of the dither matrices the halftone processing section 44 has, the dither matrix with the array number larger than at least one of the other dither matrix is set as the dither matrix to be used for the halftone processing. For example, in the case in which the halftone processing section 44 has a 3×6 pixel dither matrix, a 4×8 pixel dither matrix, and a 5×10 pixel dither matrix, the 4×8 pixel dither matrix or the 5×10 pixel dither matrix is set for the photographic image depending on the degree of the gradation priority which is input from the operation display section 20.

The embodiment of the present invention and the variant thereof were described above, but the description contents in the embodiment and the variant are the preferred examples of the image forming apparatus 1 to which the present invention is applicable, and the invention is not to be limited to these examples.

For example, in the embodiment and the variant, the dither matrices are assumed to be of 3×6 pixels and 4×8 pixels, but not limited to this context.

Further, in the embodiment, although the description was made by taking the example of a monochrome copier, the present invention is also applicable to a color copier.

Figure 8:
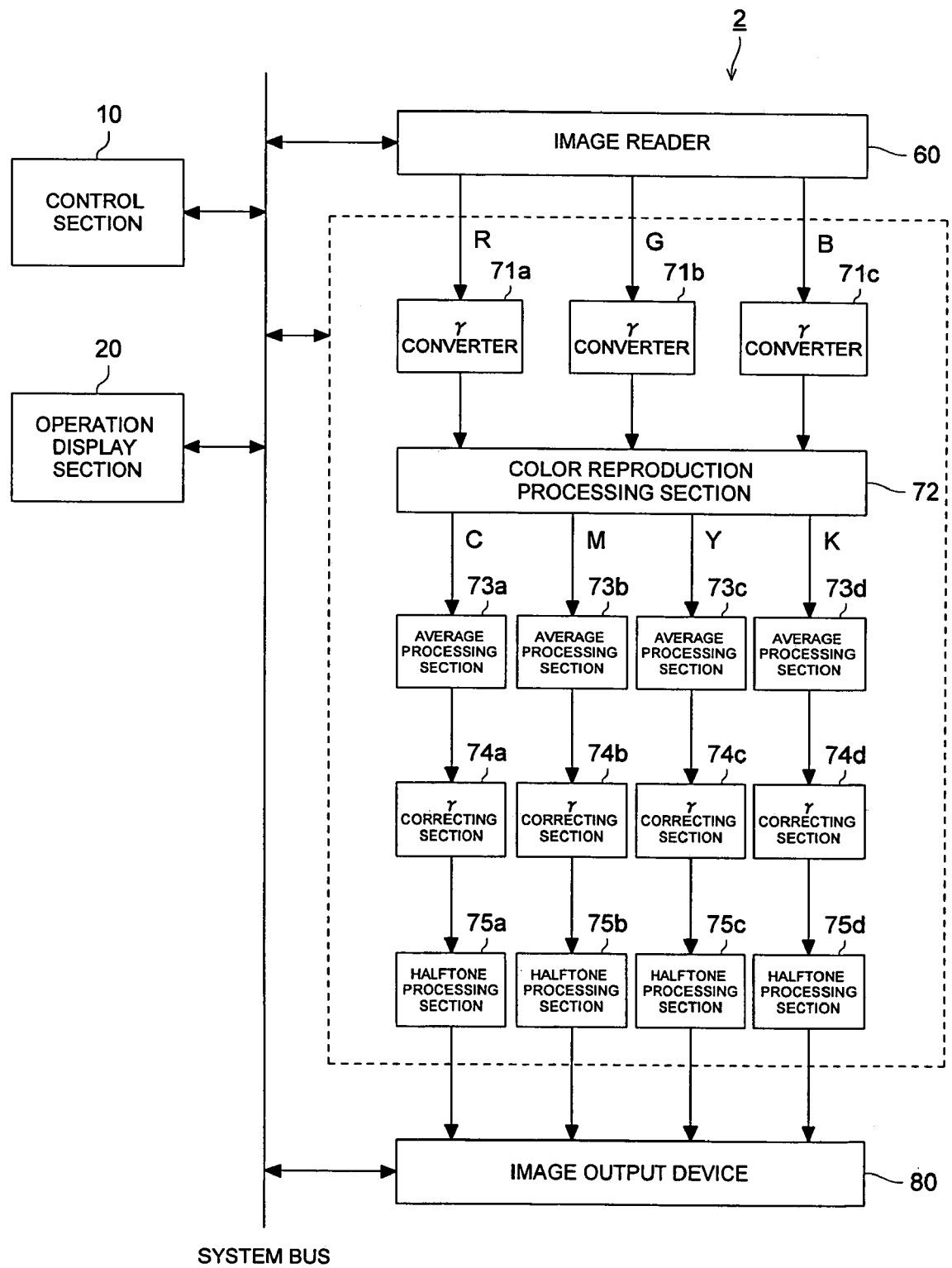
[FIG. 8] A block diagram showing the functional configuration of an image forming apparatus 2 which is a color copier.
Figure 10:
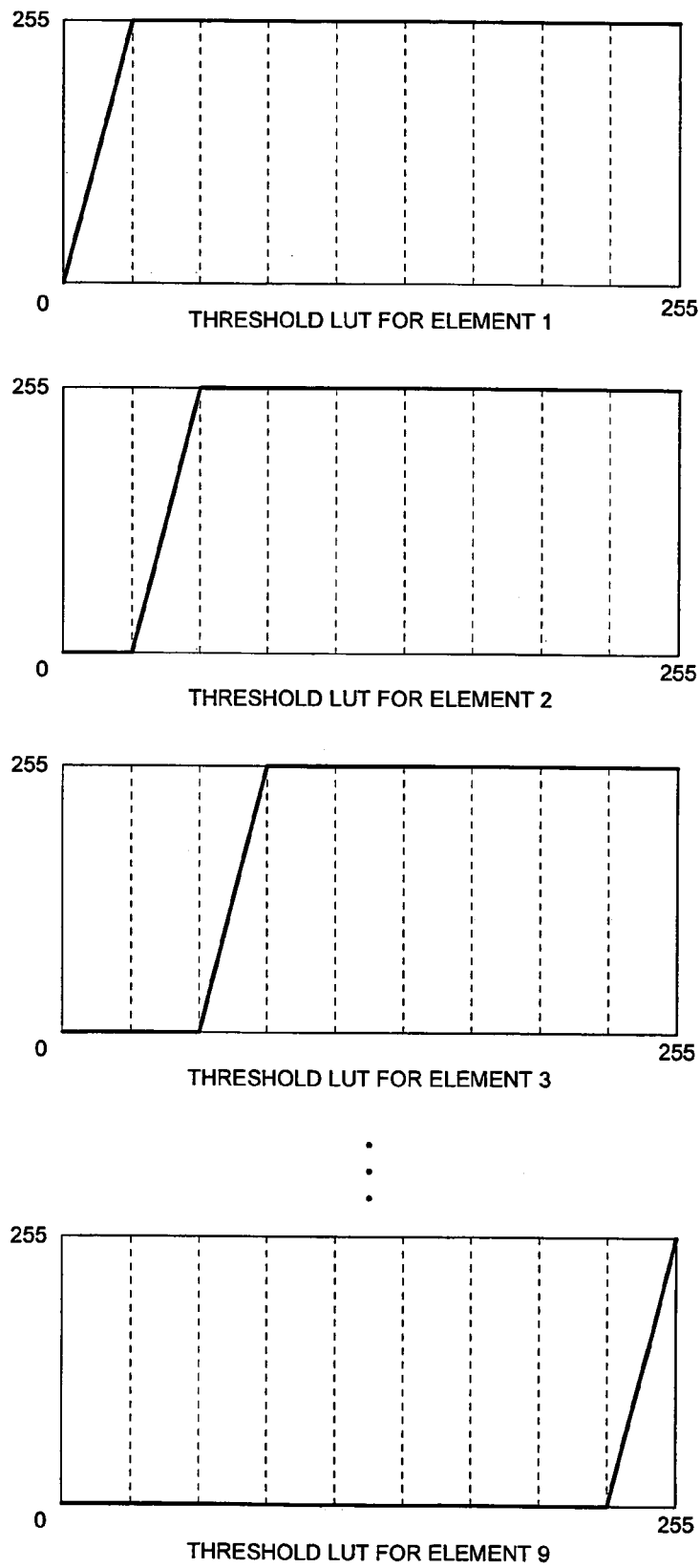
[FIG. 10] A view showing threshold LUTs correlated to each of the elements of FIG. 9.
Figure 11:
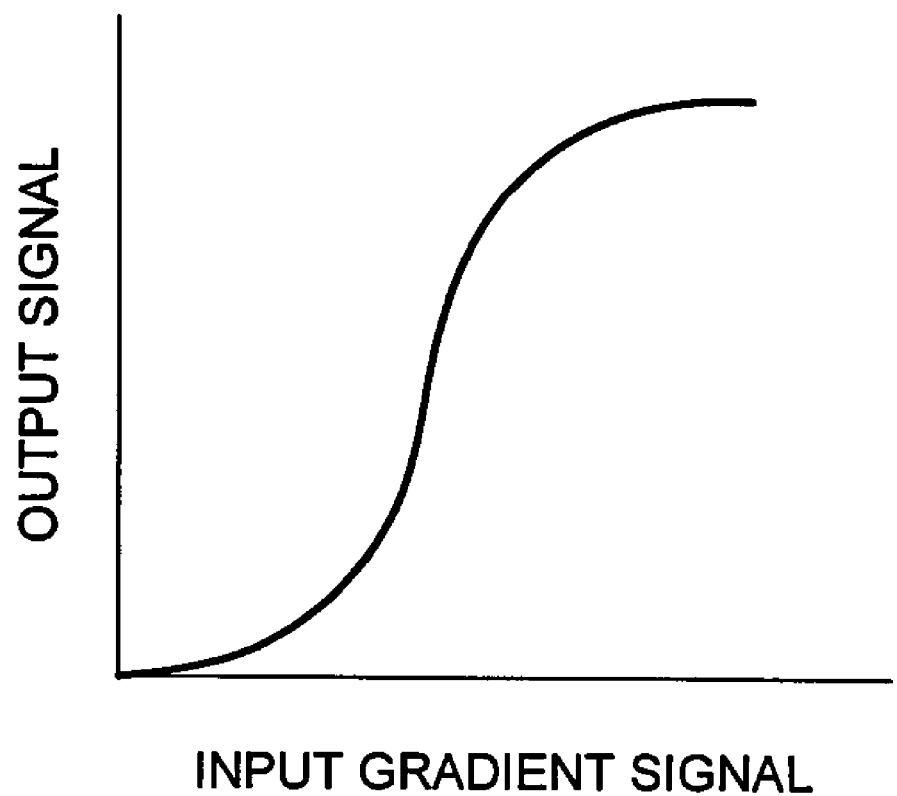
[FIG. 11] A view showing the output characteristic for one pixel in an image forming apparatus of electrophotographic system.

FIG. 8 shows an example of the functional configuration of an image forming apparatus 2 which is a color copier. As shown in FIG. 8, the image forming apparatus 2 is composed of a control section 10, an operation display section 20, an image reader 60, an image processing apparatus 70, and an image output device 80. Each of the components operate under the integrated control of the control section 10 which is composed of a CPU connected thereto via a system bus and the like.

The image reader 60 is composed of a light source, a CCD (Charge Coupled Device), an A/D converter and the like, which images a reflection of a light that is light-scanned from the light source to a document and carries out photoelectric conversion, reading an image of the document as an R signal, a G signal and a B signal, A/D converting the read image and outputting it to the image processing apparatus 70.

In the image processing apparatus 70, the R, G, B image data which are input from the image reader 60 are first converted to density liner from luminance liner by γ converting sections 71a to 71c respectively, and in a color reproduction processing section 72, the R, G, B image data are converted into C, M, Y, K image data for each pixel. Average processing sections 73a to 73d carry out the same processing as the above described average processing section 42 for each of the coloring materials of the C, M, Y, K image data respectively. Gamma converting sections 74a to 74d carry out the same processing as the above described γ converting section 43 for each of the coloring materials of the C, M, Y, K image data respectively. Halftone processing sections 75a to 75d carry out the same processing as the above described halftone processing section 44 for each of the coloring materials of the C, M, Y, K image data respectively. Incidentally, the halftone processing sections 75a to 75d are each provided with dither matrices depending on the colors to be processed.

The image output device 80, which is a color image output device, converts the image data output from the image processing apparatus 70 into pulse width modulation, carrying out the processings of image generation, transfer, and fixing based on the image data and then outputting. As described above, the present invention is also applicable to the color copier.

Further, in the embodiment, the image forming apparatus of the electrophotographic system was described, but it is not limited to this system, and for example, may be the inkjet system or other systems. Further, the present invention can be also applicable to, not only the copier, but also printers that print image data sent from a host device such as a PC connected via a LAN or other networks.

In addition, it is to be understood that detail configurations and operations of the image forming apparatuses 1 and 2 can also be modified accordingly without departing from the gist of the present invention.

In addition to the aforementioned embodiments, it is possible to represent halftone without deteriorating the gradation property of the input image while maintaining a pattern generated by the halftone processing as a dot-like shape, so that an image with good gradation property can be output.

Also, if the input image data is a photographic image as a result of recognizing the type of the input image data, an image with better gradation property can be output.

What is claimed is:

1. An image processing apparatus, comprising:
    a halftone processing section which executes a halftone process for image data input into the image processing apparatus,
    wherein the halftone processing section executes the halftone process by using a dither matrix to convert a gradation value of each pixel of the input image data into halftone image data in which each pixel is represented by a dot in a pixel block which has a plurality of dots,
    wherein an order of producing the dots in the halftone process is consecutive in a main scanning direction, in the pixel block, and
    wherein a starting position of producing the dots in the pixel block is shifted in the main scanning direction by no less than two dots from a starting position of the adjoining pixel block in a sub scanning direction.

2. The image processing apparatus of claim 1, further comprising:
    a recognizing section which recognizes if the input image data is photo image data,
    wherein the halftone processing section includes a plurality of dither matrixes of different array number and uses the dither matrix, in the plurality of dither matrixes, with a larger array number than at least one of the other dither matrixes for the halftone process if the recognizing section recognizes the input image data is photo image data.

3. The image processing apparatus of claim 2, wherein the recognizing section recognizes that the input image data is photo image data if a size of a photo image region in an image region of the input image data is larger than a predetermined reference value.

4. The image processing apparatus of claim 2, wherein if the input image data is recognized to be photo image data by the recognizing section, the halftone processing section uses, in the halftone process, the dither matrix with the larger array number than one which the halftone processing section uses in a case of the input image data being recognized to be character image data by the recognizing section.

5. The image processing apparatus of claim 2, wherein the halftone processing section is capable of selectively executing a process prioritizing gradation property over resolution and a process prioritizing resolution over gradation property, and if the input image data is recognized to be photo image data by the recognizing section, the halftone processing section processes the input image data by executing the process prioritizing gradation property over resolution.

6. An image forming apparatus which comprises the image processing apparatus of claim 1.

7. The image forming apparatus of claim 6, further comprising:
    an image forming section in which an image is formed on the recording medium in accordance with the halftone image data from execution of the halftone process by the halftone processing section,
    wherein the main scanning direction corresponds to a main scanning direction in the image forming section and the sub scanning direction corresponds to a sub scanning direction in the image forming section.

8. An image forming apparatus which comprises the image processing apparatus of claim 2.

9. An image forming apparatus which comprises the image processing apparatus of claim 3.

10. An image forming apparatus which comprises the image processing apparatus of claim 4.

11. An image forming apparatus which comprises the image processing apparatus of claim 5.

12. A computer-readable recording medium having stored thereon a program for controlling a computer to execute an image processing process comprising:
    executing a halftone process for input image data,
    wherein the halftone process is executed in the halftone process by using a dither matrix to convert a gradation value of each pixel of the input image data into a halftone image data in which each pixel is represented by a dot in a pixel block which has a plurality of dots,
    wherein an order of producing the dots in the halftone process is consecutive in a main scanning direction, in the pixel block, and
    wherein a starting position of producing the dots in the pixel block is shifted in the main scanning direction by no less than two dots from a starting position of the adjoining pixel block in a sub scanning direction.

13. The computer-readable recording medium of claim 12 wherein the halftone process comprises:
    recognizing if the input image data is photo image data, and
    using one of a plurality of dither matrixes of different array number stored in a memory section having a larger array number than at least one of the other dither matrixes if the input image data is recognized to be photo image data.

14. The computer-readable recording medium of claim 13, wherein the input image data is recognized to be photo image data if a size of a photo image region in an image region of the input image data is larger than a predetermined reference value.

15. The computer-readable recording medium of claim 13, wherein if the input image data is recognized to be photo data the halftone process uses the dither matrix with the larger array number than in a case of the input image data being recognized to be character image data.

16. The computer-readable recording medium of claim 13, wherein in the halftone process comprises selectively executing a process prioritizing gradation property over resolution and a process prioritizing resolution over gradation property, and when the input image data is recognized to be photo image data, the halftone process executes the process prioritizing gradation property over resolution on the input image data.

17. An image processing method, comprising:
    executing halftone process for input image data by using a dither matrix, to convert a gradation value of each pixel of the input image data into halftone image data in which each pixel is represented by a dot in a pixel block which has a plurality of dots, wherein an order of producing the dots in the halftone process is consecutive in a main scanning direction, in the pixel block, and wherein a starting position of producing the dots in the pixel block is shifted in the main scanning direction by no less than two dots from a starting position of the adjoining pixel block in a sub scanning direction.

18. The image processing method of claim 17, further comprising:

recognizing if the input image data is photo image data, wherein the halftone process uses one of a plurality of dither matrixes of different array number stored in a memory section having a larger array number than at least one of the other dither matrixes if the input image data is recognized to be photo image data.

19. The image processing method of claim 18, wherein the input image data is recognized to be photo image data if a size of a photo image region in an image region of the input image data is larger than a predetermined reference value.

20. The image processing method of claim 18, wherein if the input image data is determined to be photo image data, the half tone process uses the dither matrix with the larger array number than in a case of the input image data being recognized to be character image data.

21. The image processing method of claim 18, wherein if the input image data is recognized to be photo image data, the halftone process executes a process prioritizing gradation property over resolution on the input image data.

* * * * *